United States Patent
Yamagami

(10) Patent No.: US 10,133,518 B2
(45) Date of Patent: Nov. 20, 2018

(54) IMAGE FORMING APPARATUS AND RECORDING MEDIUM SUITABLE FOR TEST COPY

(71) Applicant: KYOCERA Document Solutions Inc., Osaka (JP)

(72) Inventor: Hiromi Yamagami, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/799,901

(22) Filed: Oct. 31, 2017

(65) Prior Publication Data

US 2018/0121140 A1   May 3, 2018

(30) Foreign Application Priority Data

Oct. 31, 2016   (JP) .................. 2016-212590

(51) Int. Cl.
  *G06F 3/12*   (2006.01)
  *G06K 9/00*   (2006.01)
  *H04N 1/21*   (2006.01)

(52) U.S. Cl.
  CPC .......... *G06F 3/1204* (2013.01); *G06F 3/1208* (2013.01); *G06F 3/1256* (2013.01); *G06K 9/00456* (2013.01); *H04N 1/2104* (2013.01); *H04N 2201/0094* (2013.01)

(58) Field of Classification Search
  CPC .... G06F 3/1204; G06F 3/1256; G06F 3/1208; G06K 9/00456; H04N 1/2104; H04N 2201/0094
  See application file for complete search history.

(56) References Cited

U.S. PATENT DOCUMENTS

2009/0279781 A1\* 11/2009 Kitabatake ......... G06K 9/00456
  382/176

FOREIGN PATENT DOCUMENTS

JP   2009-230398 A   10/2009

\* cited by examiner

*Primary Examiner* — Kent Yip
(74) *Attorney, Agent, or Firm* — Hawaii Patent Services; Nathaniel K. Fedde; Kenton N. Fedde

(57) ABSTRACT

Provided is an image forming apparatus that solves a problem of work related to copying becoming complicated when a test copy is performed. The image forming apparatus according to this disclosure includes a scanner unit, a printer-control unit, a storage device, a characteristic-extracting unit, and a system-control unit. The printer-control unit executes a printing process of image data. The storage device stores image data of a document having plural pages that is read by the scanner unit. The characteristic-extracting unit, based on an extraction instruction to extract characteristics of an object, extracts characteristics of the object by object recognition of image data for each of the pages. The system-control unit, based on a selection instruction to select characteristics of the object, instructs the characteristic-extracting unit to perform the extraction, and instructs the printer-control unit to print image data of a page having the object characteristics that are extracted by the characteristic-extracting unit.

4 Claims, 15 Drawing Sheets

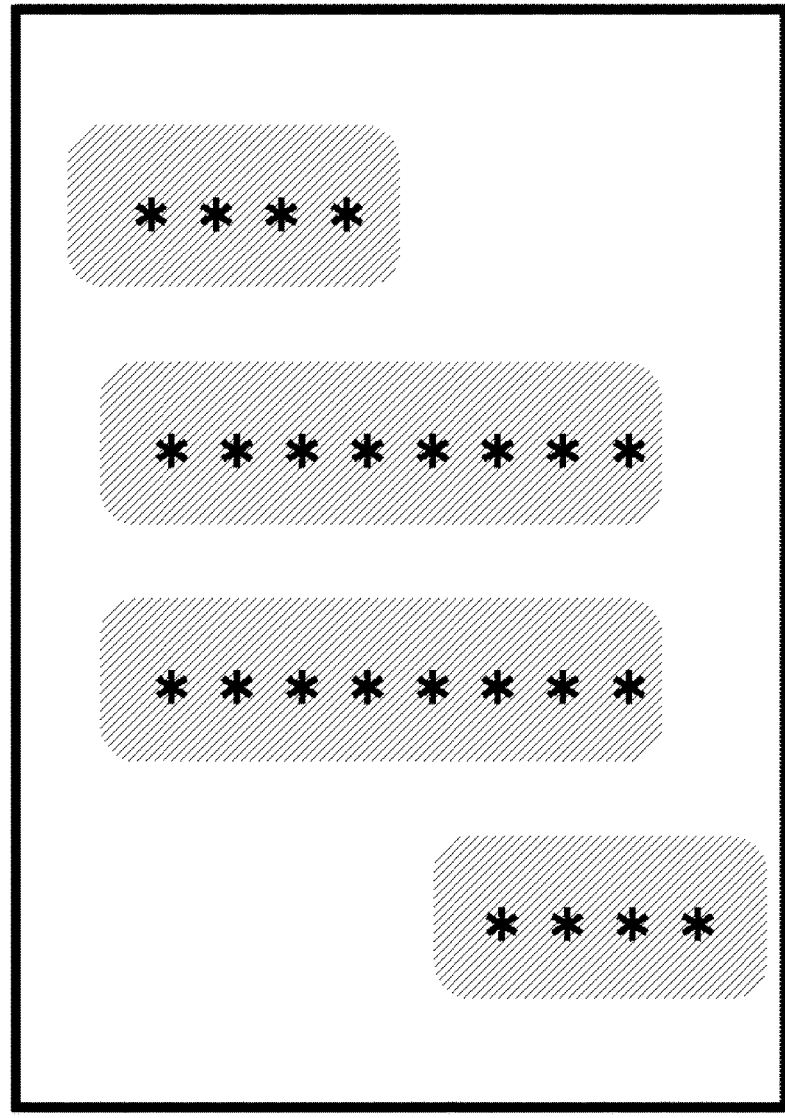

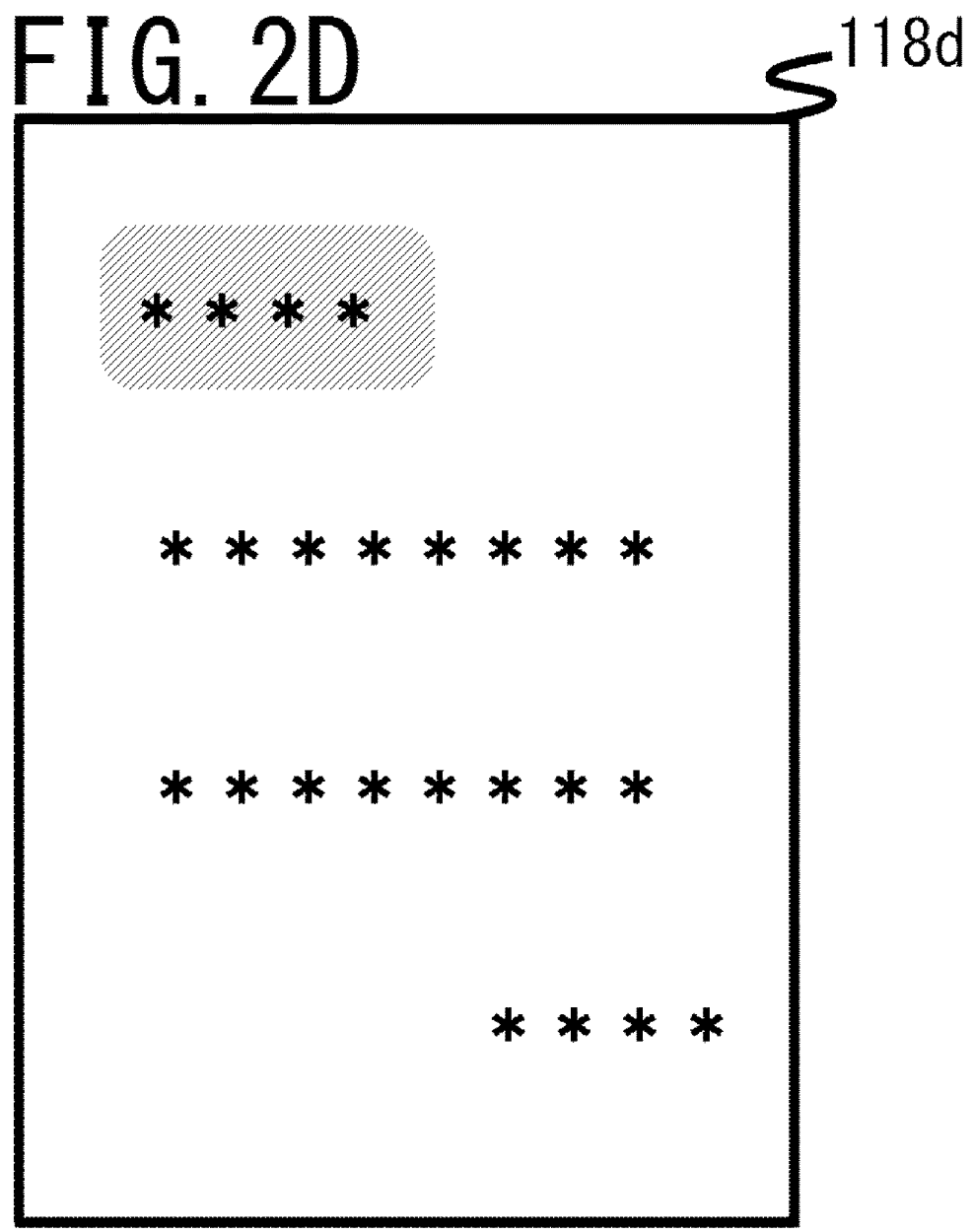

\* \* \* \*

\* \* \*

\* \* \* \* \* \* \* \*

\* \* \* \*

118f

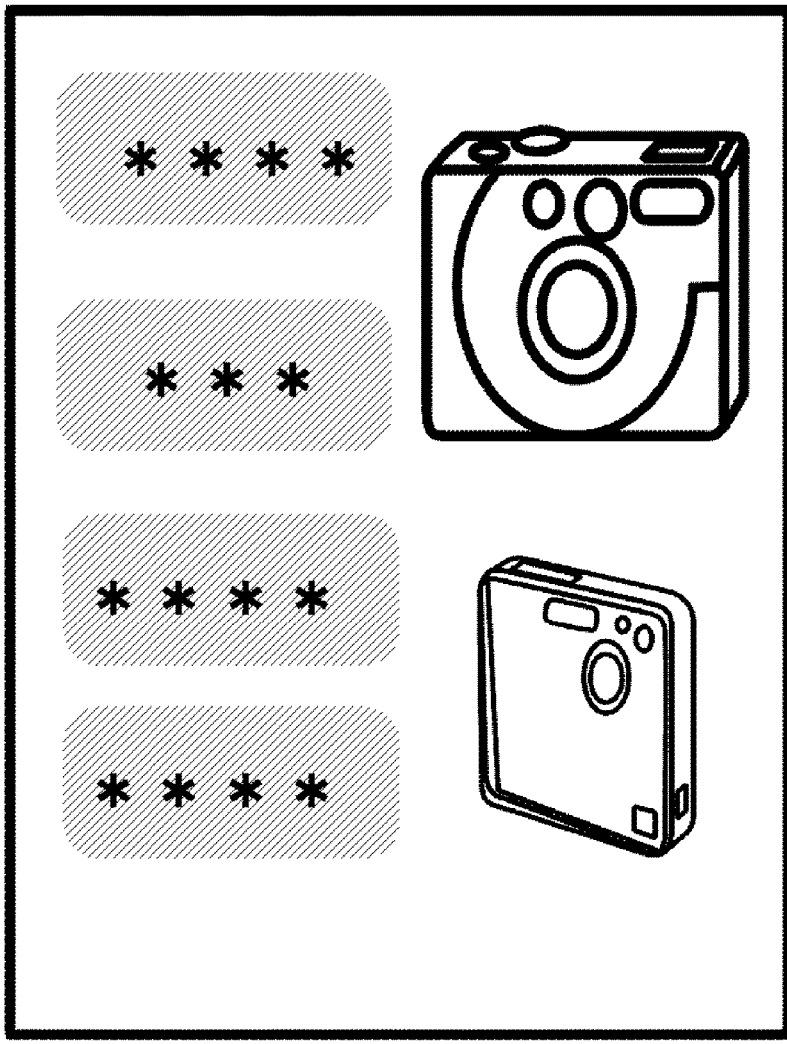

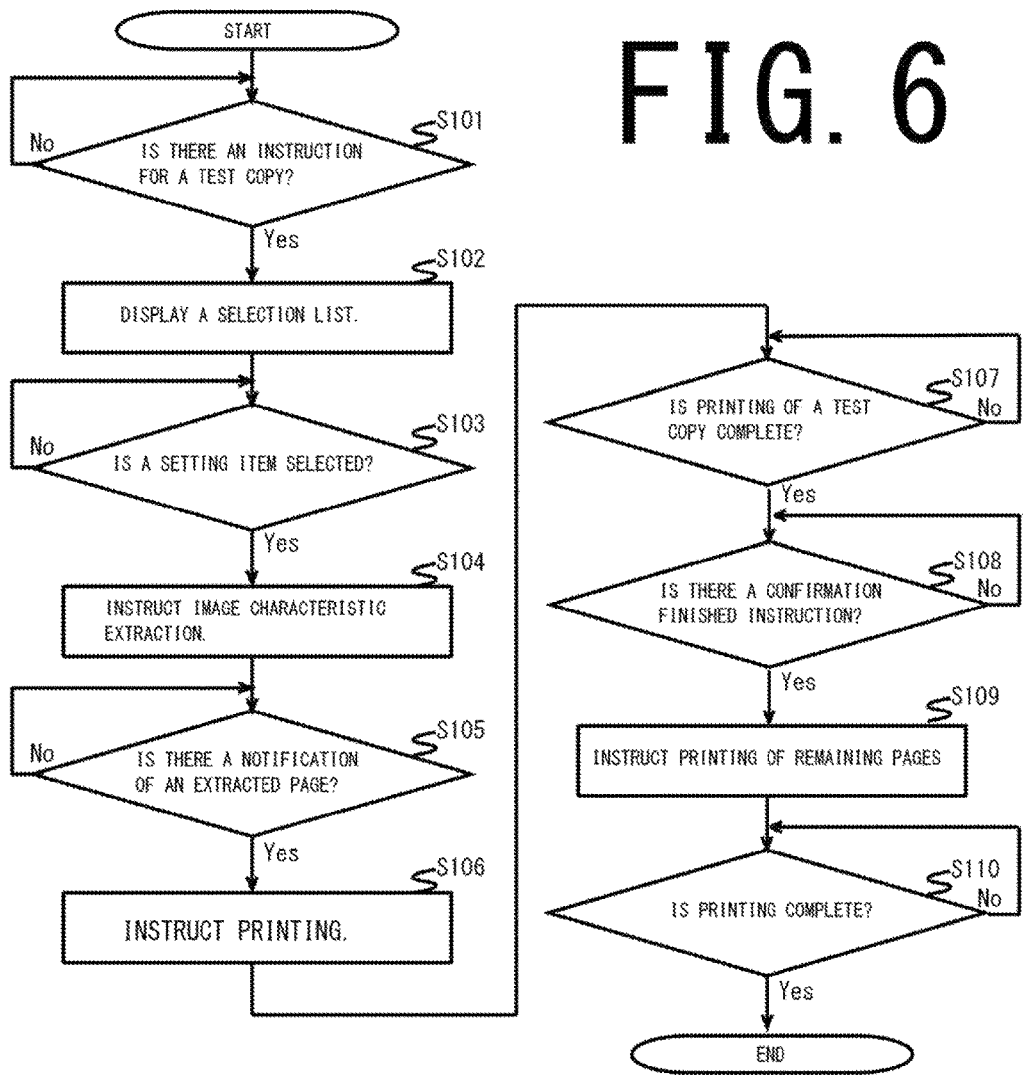

IMAGE FORMING APPARATUS AND RECORDING MEDIUM SUITABLE FOR TEST COPY

INCORPORATION BY REFERENCE

This application is based on and claims the benefit of priority from Japanese Patent Application No. 2016-212590 filed on Oct. 31, 1016, the contents of which are hereby incorporated by reference.

BACKGROUND

The present disclosure relates to an image forming apparatus and recording medium suitable for test copy.

For example, in an image forming apparatus that is an MFP (Multifunction Peripheral) such as a multifunction printer, a combination machine, and the like, there are models equipped with a printing function, a copying function, a FAX function, a data transmitting and receiving function via a network, and the like. Incidentally, when forming an image by an image forming apparatus, sometimes whether or not the finished image is as expected is confirmed.

In a typical example of an image forming apparatus that is related to this kind of confirmation of a finished image, when a user instructs "trial printing" on the printer driver and selects a target page of a document, an object-analysis unit analyzes whether or not a drawing object is included on the target page. Then, when there is a drawing object and also a valid function, a printing-setting-generating unit generates a combination of plural recommended printing settings that have a high possibility of improving printing quality.

SUMMARY

The image forming apparatus according to an embodiment of this disclosure includes a scanner unit, a printer-control unit, a storage device, a characteristic-extracting unit, and a system-control unit. The printer-control unit executes a printing process of image data. The storage device stores image data of a document having plural pages that is read by the scanner unit. The characteristic-extracting unit, based on an extraction instruction to extract characteristics of an object, extracts characteristics of the object by object recognition of image data for each of the pages. The system-control unit, based on a selection instruction to select characteristics of the object, instructs the characteristic-extracting unit to perform the extraction, and instructs the printer-control unit to print image data of a page having the object characteristics that are extracted by the characteristic-extracting unit.

The a non-transitory computer-readable recording medium according to an embodiment of this disclosure is a recording medium that stores an image forming program that can be executed by a computer of an image forming apparatus that has a printer-control unit that executes a printing process for printing image data. The image forming program causes the computer to execute: a process that stores image data, a process to extract characteristics of an object, and a process to instruct the characteristic-extracting unit to perform extraction, and instruct the printer-control unit to print image data. In the process to store image data, the storage device stores image data of a document having plural pages that are read by a scanner unit. In the process to extract characteristics of an object, the characteristic-extracting unit, based on an extraction instruction to extract characteristics of an object, extracts characteristics of the object by object recognition of image data for each page. In the process to instruct the characteristic-extracting unit to perform extraction, and instruct the printer-control unit to print image data, the system-control unit, based on a selection instruction to select characteristics of the object, instructs the characteristic-extracting unit to perform the extraction, and instructs the printer-control unit to print image data of a page having the object characteristics that are extracted by the characteristic-extracting unit.

BRIEF DESCRIPTION OF THE DRAWINGS

FIG. 2A explains an example of extracting characteristics of an object by the characteristic-extracting unit in FIG. 1, and illustrates an image file that includes color text.

FIG. 2B explains an example of extracting characteristics of an object by the characteristic-extracting unit in FIG. 1, and illustrates an image file that includes monochrome text.

FIG. 2D explains an example of extracting characteristics of an object by the characteristic-extracting unit in FIG. 1, and illustrates an image file when color text and monochrome text are mixed, and there is a large amount of monochrome text.

FIG. 4A explains an example of extracting characteristics of an object by the characteristic-extracting unit in FIG. 1, and illustrates an image file when images and color text are mixed, and there is a large number of images.

FIG. 6 illustrates the steps of a test copy process by the MFP in FIG. 1.

DETAILED DESCRIPTION

In the following, an embodiment of an image forming apparatus according to the present disclosure is explained with reference to FIG. 1 to FIG. 6. As an example of an image forming apparatus in the following explanation, is an MFP that is a combination peripheral machine that is equipped, for example, with a printing function, a copying function, a FAX function and a data transmitting and receiving function via a network.

Figure 1:
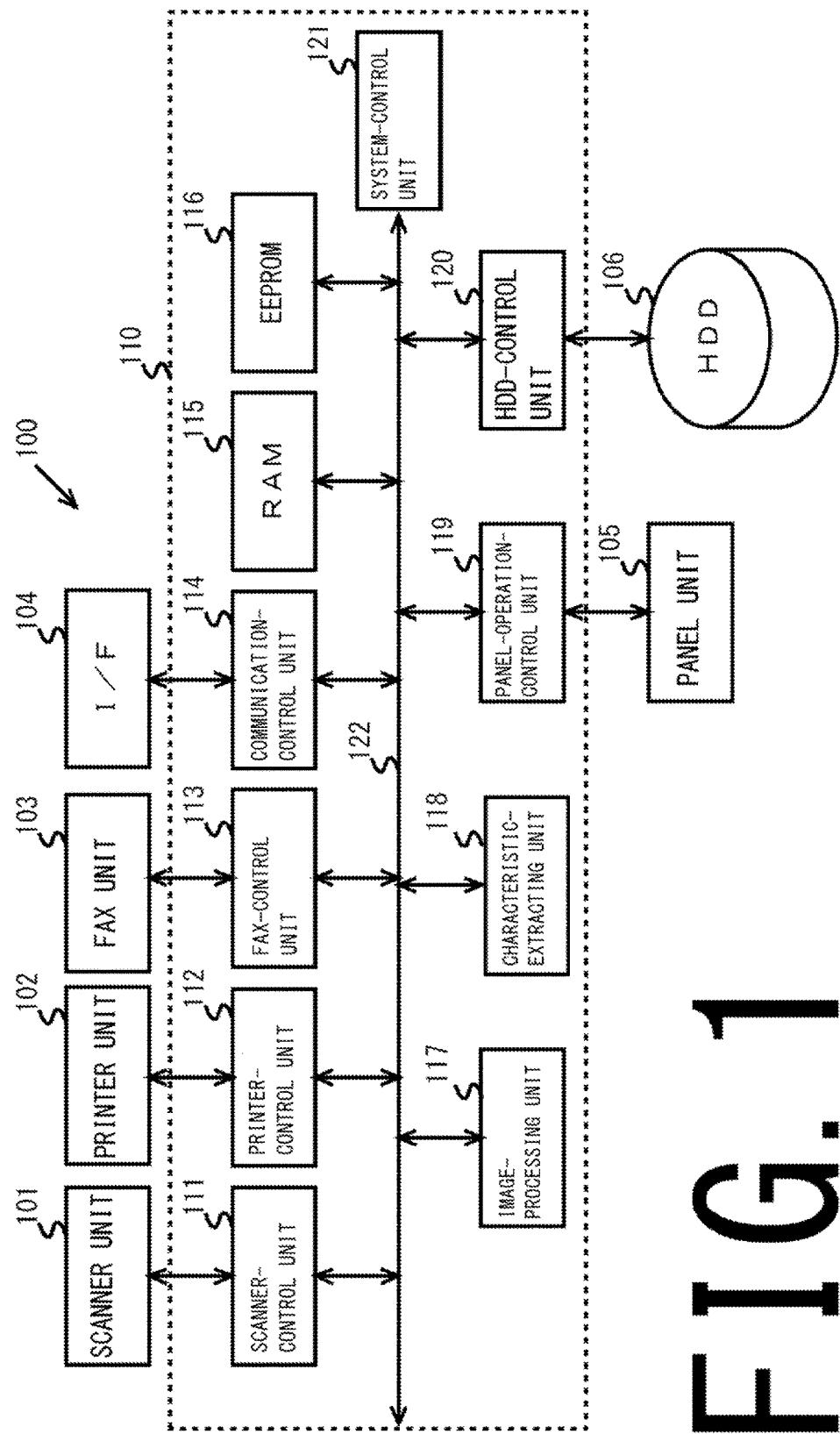
FIG. 1 illustrates an embodiment when the image forming apparatus according to the present disclosure is applied to an MFP.

First, as illustrated in FIG. 1, an MFP 100 includes a control unit 110 that controls the operation of a scanner unit 101, a printer unit 102, a FAX unit 103, an I/F 104, a panel unit 105, and an HDD 106.

The scanner unit 101 is a device that converts an image of a document that is read by an image sensor to digital image data, and inputs that data to the control unit 110. The printer unit 102 is a device that prints image data on paper based on printing data that is outputted from the control unit 110. The FAX unit 103 is a device that transmits data that is outputted from the control unit 110 to a facsimile of another party over telephone lines, and receives data from the facsimile of another party and inputs that data to the control unit 110.

The I/F 104 is connected to an information provision server or the like via a network. The I/F server 104 may take charge of communication with other MFPs, user terminals and the like, and may take charge of communication with a content server, web server and the like. The panel unit 105 is a device such as a touch panel that performs a display for the printing function, copying function, FAX function, data transmitting and receiving function via a network and for various settings of the MFP 100. The HDD 106 is a storage device that stores application programs and the like for providing the various functions of the MFP 100. Moreover, the HDD 106 has user boxes for storing printing jobs that are registered from a user terminal, for example, and data corresponding to printing and the like that is in a page description language.

The control unit 110 is a processor that controls the overall operation of the MFP 100 by executing application programs such as an authentication program and the like, image forming program, control program and the like. The control unit 110 includes a scanner-control unit 111, a printer-control unit 112, a FAX-control unit 113, a communication-control unit 114, a RAM 115, an EEPROM 116, an image-processing unit 117, a characteristic-extracting unit 118, a panel-operation-control unit 119, an HDD-control unit 120, and a system-control unit 121. These are connected to a data bus 122.

The scanner-control unit 111 controls the reading operation of the scanner unit 101. The printer-control unit 112 controls the printing operation of the printer unit 102. The FAX-control unit 113 controls the data transmitting and receiving operation by the FAX unit 103. The communication-control unit 114, by the I/F 104, performs control of transmitting and receiving data and the like via a network.

The RAM 115 is a work memory for executing programs. Moreover, the RAM 115 stores printing data for which image processing has been performed by the image-processing unit 117. The EEPROM stores a control program that performs operation checks and the like of each unit. Moreover, the EEPROM stores firmware and the like for operating the scanner unit 101, the printer unit 102, the FAX unit 103, the I/F 104, the panel unit 105, the HDD 106 and the like.

The image-processing unit 117 performs image processing of image data that is read by the scanner unit 101. Moreover, the image-processing unit 117 performs image processing of printing target data that is registered in user boxes of the HDD 106. The system-control unit 121 causes the printing data for which image processing has been performed by the image-processing unit 117 to be temporarily stored in the RAM 115.

Figure 5:
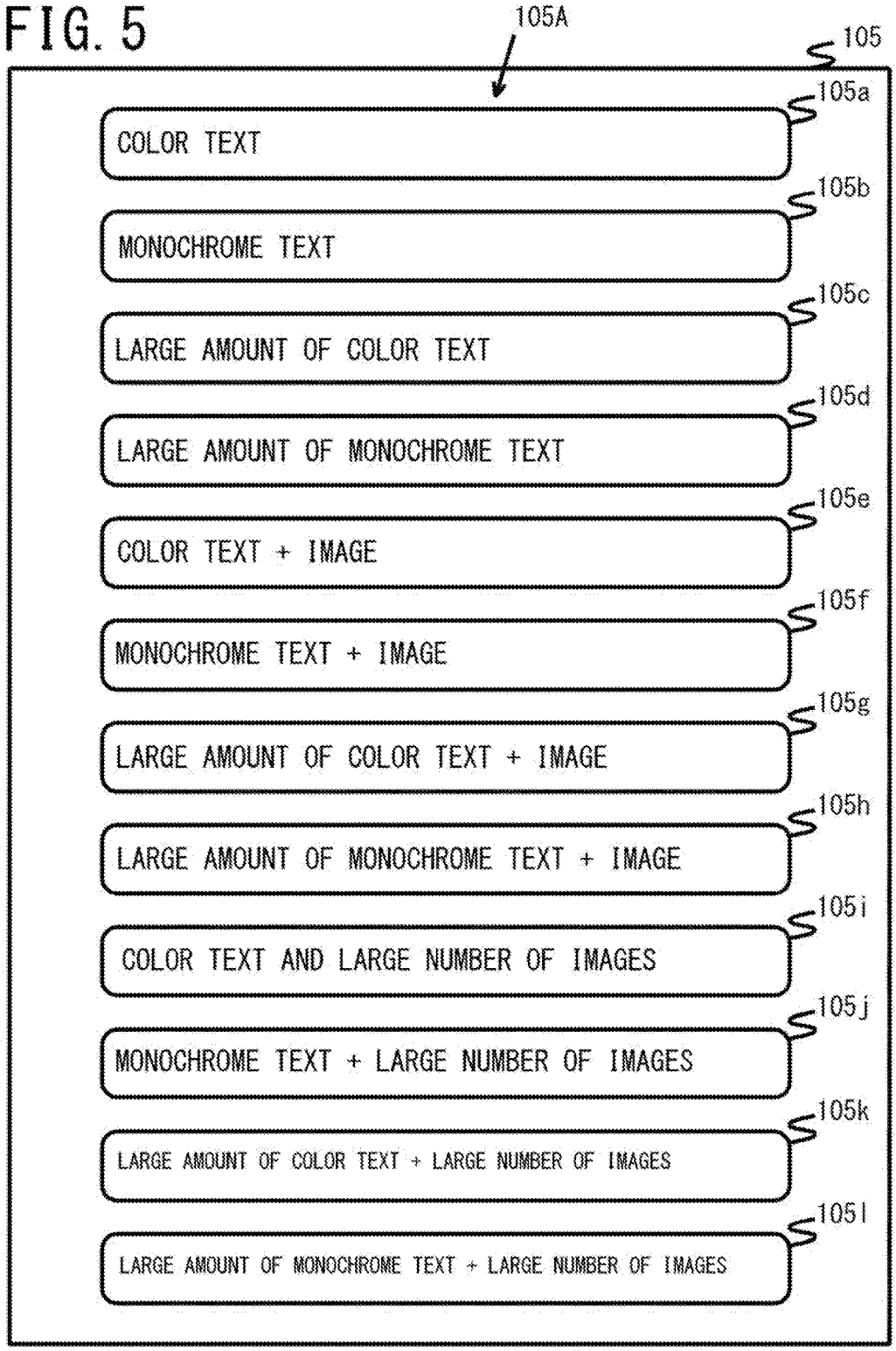
FIG. 5 illustrates example of a selection list of test copy that is displayed on the panel unit in FIG. 1.

The characteristic-extracting unit 118, as will be described in detail later, according to an instruction from the system-control unit 121, performs recognition (hereafter, referred to as object recognition) of characters, images and characteristics of these for image data of each page that is read by the scanner unit 101, and respectively extracts color text, monochrome text, and images as objects. Moreover, the characteristic-extracting unit 118 notifies the system-control unit 121 of pages that correspond to the setting items 105a to 105l that are selected via the panel unit 105 from a selection list 105A as illustrated in FIG. 5 and that will be described later. The selection list 105A is stored, for example, in the HDD 106. The characteristic-extracting unit 118 may extract objects other than text as images.

The panel-operation-control unit 119 controls the display operation of the panel unit 105. Moreover, the panel-operation-control unit 119, via the panel unit 105, receives the start of printing, copying, a FAX, transmitting and receiving data via a network and the like. Furthermore, the panel-operation-control unit 119, via the panel unit 105, receives a selection of setting items 105a to 105l from the selection list 105A illustrated in FIG. 5 and described later.

The system-control unit 121 controls linked operation of each of the units. Moreover, when copying or printing is selected via the panel unit 105, the system-control unit 121, by the scanner-control unit 111 or printer-control unit 112, controls reading of a document by the scanner unit 101 or printing on paper by the printer unit 102. Furthermore, during copying of a document, for example, when the panel-operation-control unit 119, via the panel unit 105, receives an instruction to confirm whether or not printing of read data on paper is finished as expected (hereafter, referred to as a test copy), the system-control unit 121, by the panel-operation-control unit 119, causes the panel unit 105 to display the selection list 105A that is illustrated in FIG. 5 that will be described later. Moreover, when the panel-operation-control unit 119, via the panel unit 105, receives a selection of a setting item 105a to 105l from the selection list 105A, the system-control unit 121 instructs the characteristic-extracting unit 118 to extract characteristics of an object that corresponds to the selected setting item 105a to 105l. Furthermore, the system-control unit 121 instructs the image-processing unit 117 and the printer-control unit 112 to print the page that is extracted by the characteristic-extracting unit 118 or the like.

Next, an example of characteristic extraction of an object by the characteristic-extracting unit 118 will be explained with reference to FIG. 2A to FIG. 4D. FIG. 2A to FIG. 4D illustrate image files after object recognition by the characteristic-extracting unit 118 of image data for each page that is read by the scanner unit 101. In FIG. 2A to FIG. 4FD, hatched \*\*\* indicates color text, and non-hatched \*\*\* indicates monochrome text.

Figure 2B:
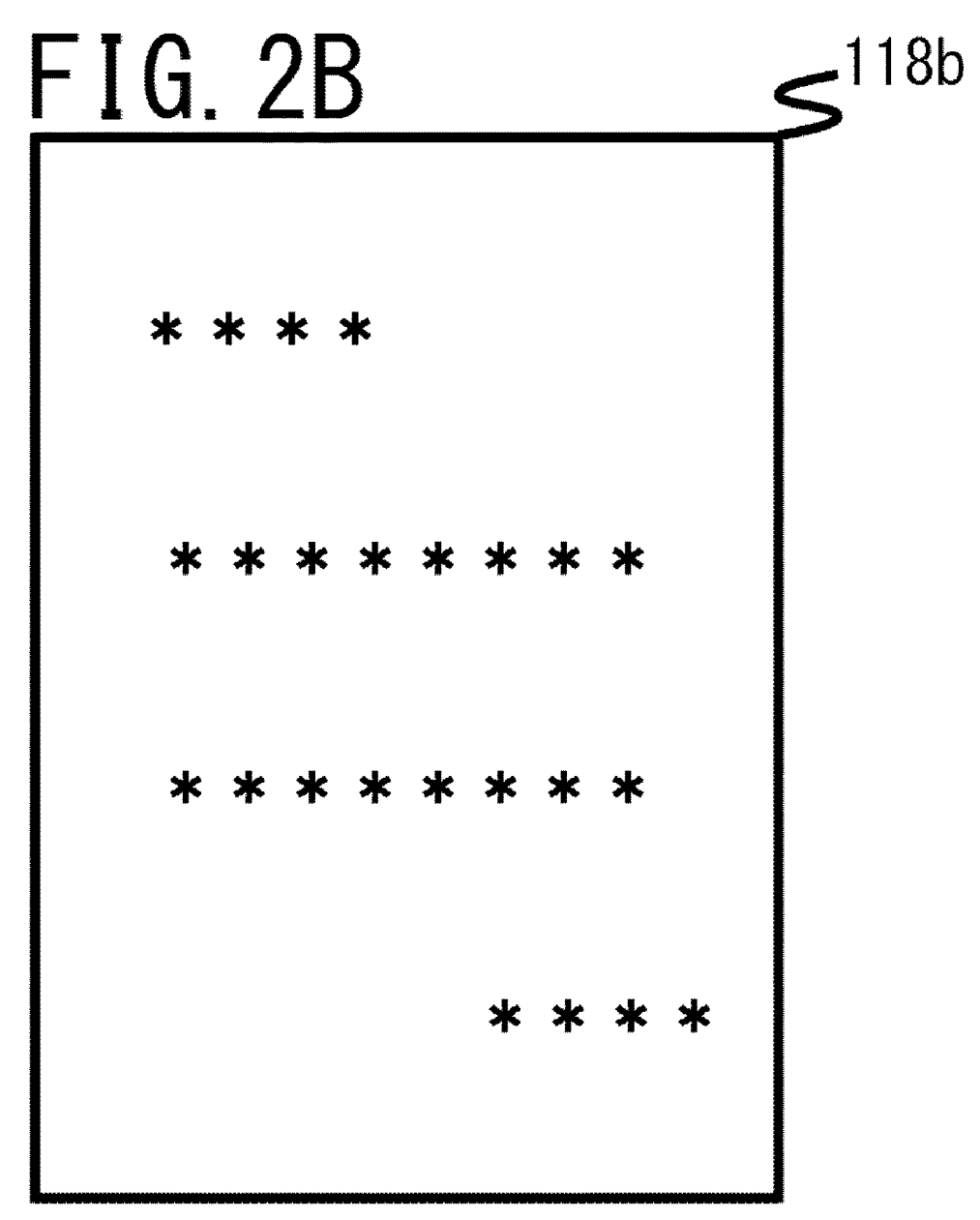
Figure 2C:
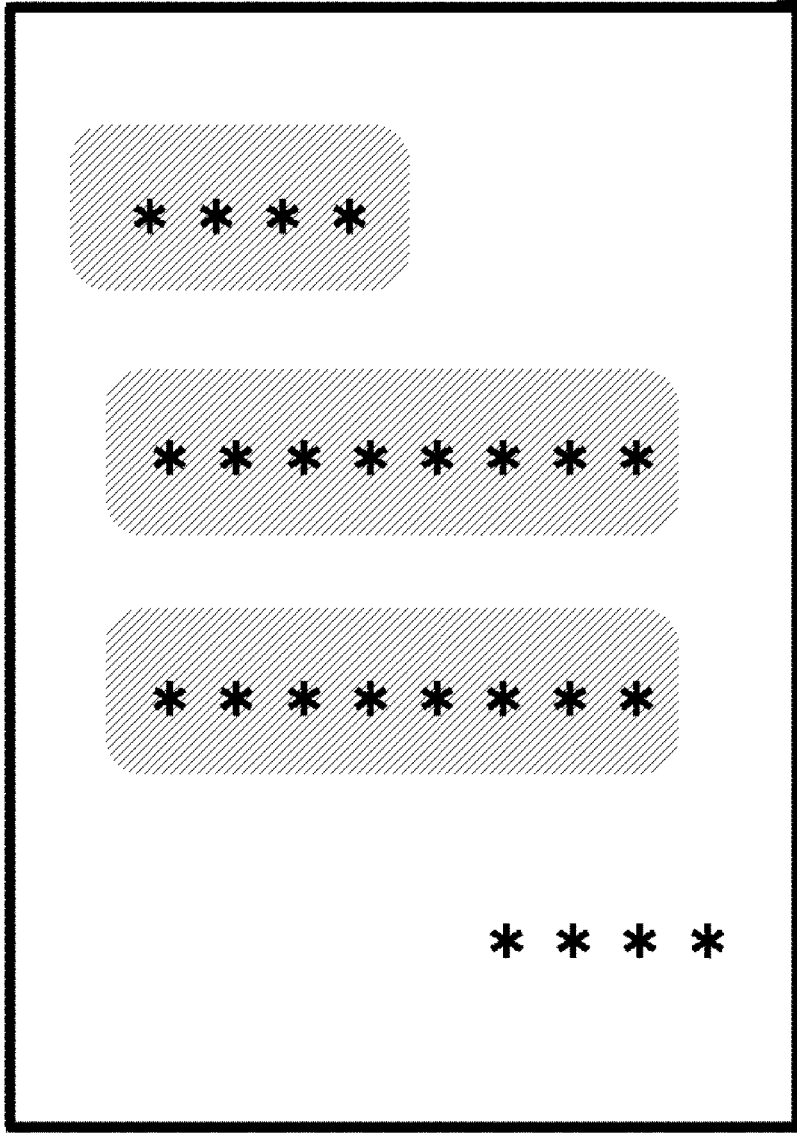
FIG. 2C explains an example of extracting characteristics of an object by the characteristic-extracting unit in FIG. 1, and illustrates an image file when color text and monochrome text are mixed, and there is a large amount of color text.

First, FIG. 2A illustrates an image file 118a composed of color text. FIG. 2B illustrates an image file 118b composed of monochrome text. FIG. 2C illustrates an image file 118c when color text and monochrome text are mixed, and there is a larger amount of color text than monochrome text. FIG. 2D illustrates an image file 118d when color text and monochrome text are mixed, and there is a larger amount of monochrome text than color text.

In this embodiment, the "amount of text" indicates the number of pixels of text. The number of pixels of text can be replaced by the number of characters of text.

Figure 3A:
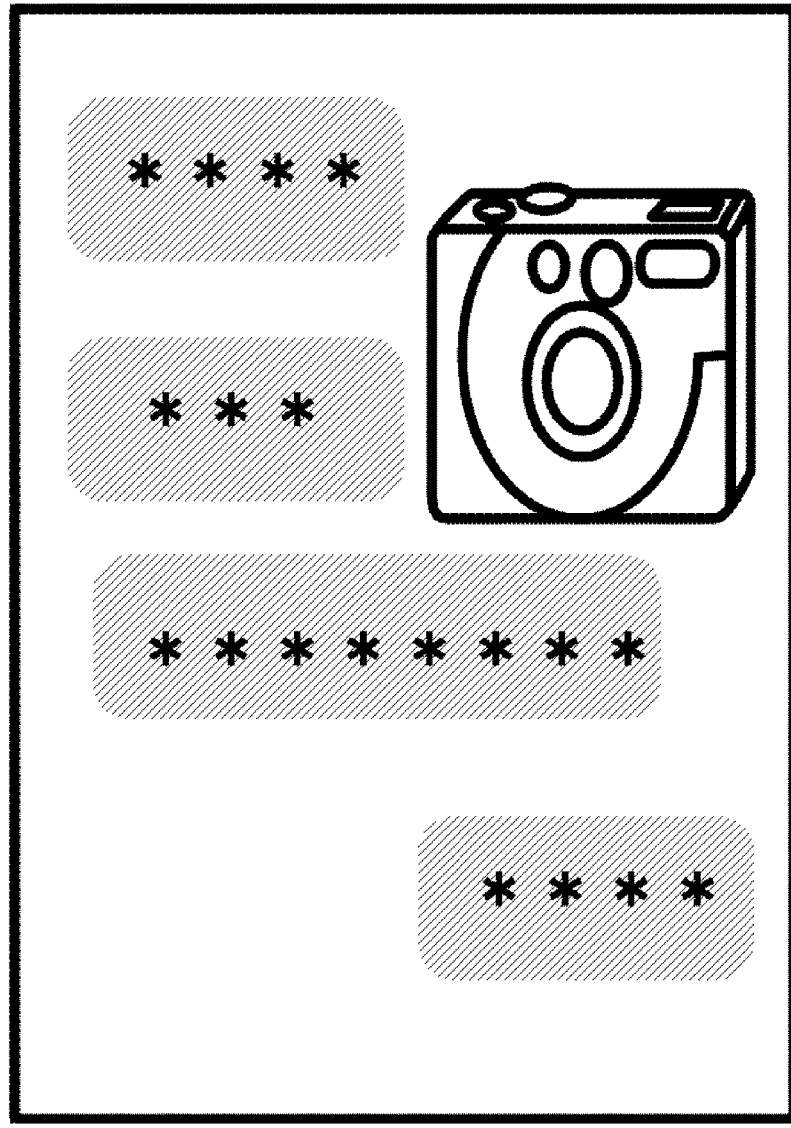
FIG. 3A explains an example of extracting characteristics of an object by the characteristic-extracting unit in FIG. 1, and illustrates an image file in which an image and color text are mixed.
Figure 3B:
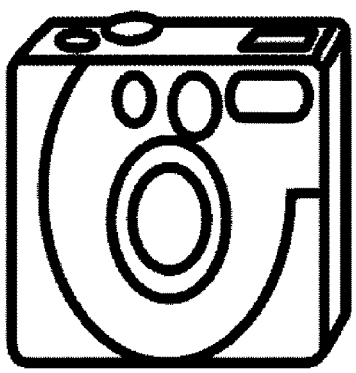
FIG. 3B explains an example of extracting characteristics of an object by the characteristic-extracting unit in FIG. 1, and illustrates an image file in which an image and monochrome text are mixed.
Figure 3C:
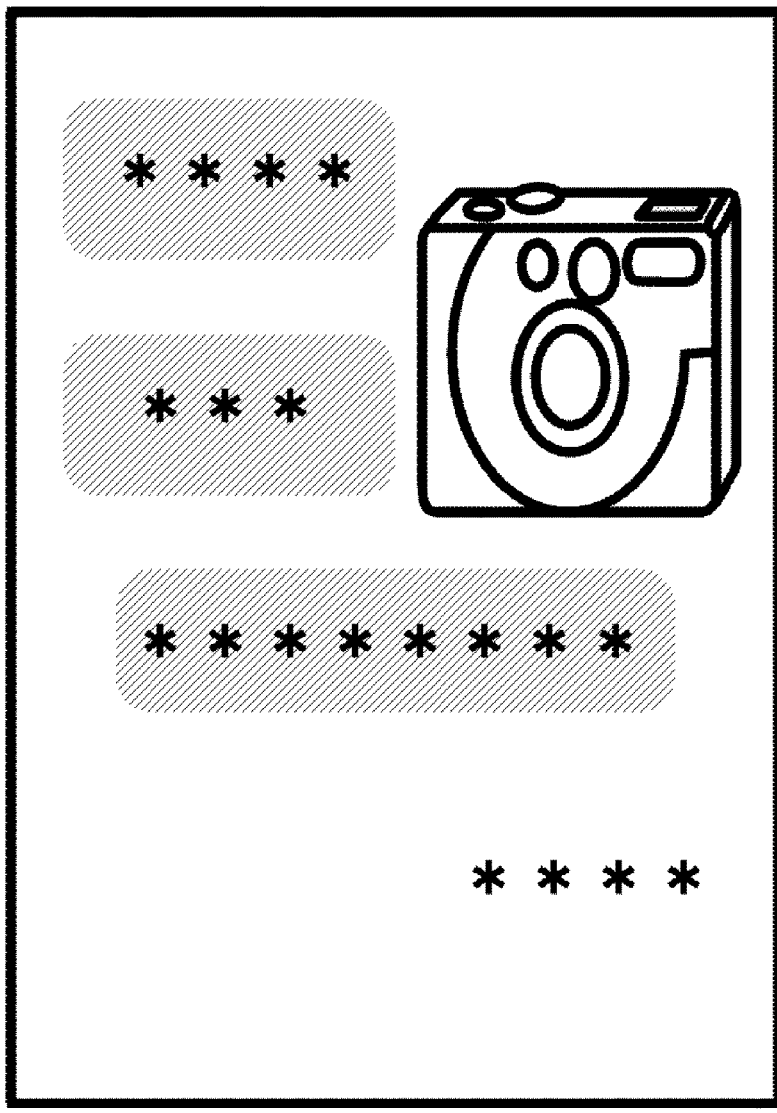
FIG. 3C explains an example of extracting characteristics of an object by the characteristic-extracting unit in FIG. 1, and illustrates an image file in which an image, color text and monochrome text are mixed, and there is a large amount of color text.
Figure 3D:
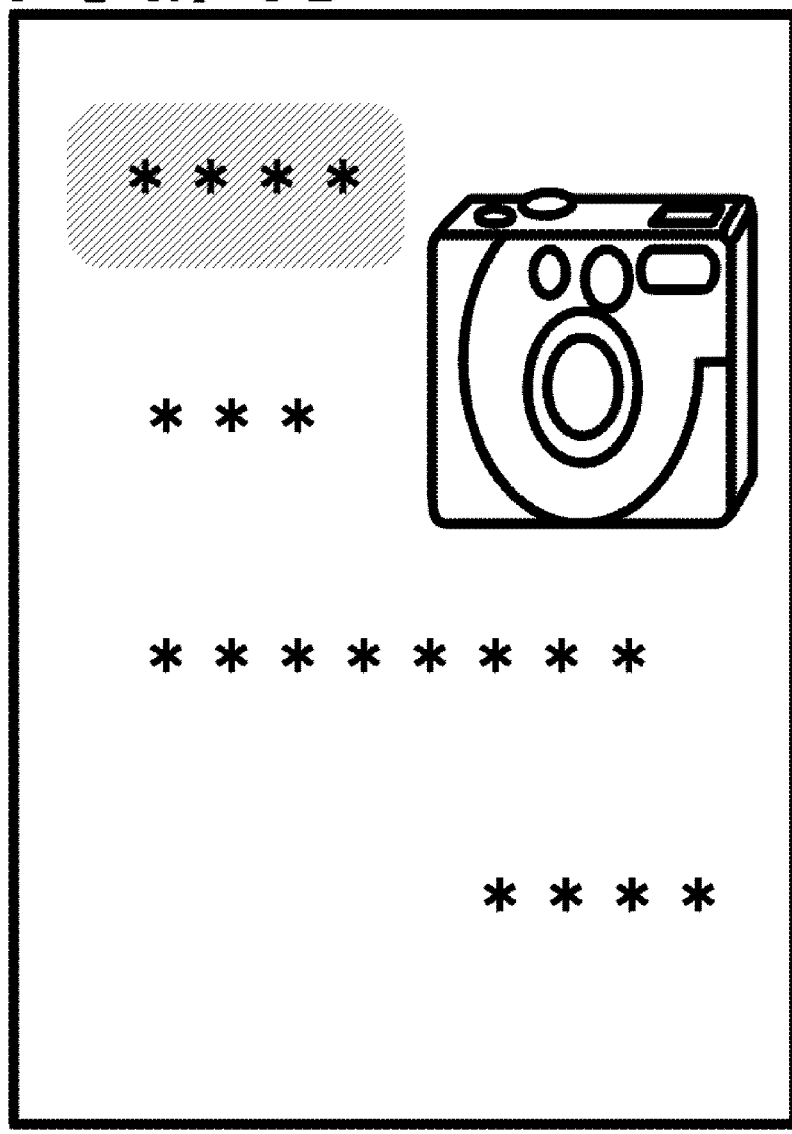
FIG. 3D explains an example of extracting characteristics of an object by the characteristic-extracting unit in FIG. 1, and illustrates an image file in which an image, color text and monochrome text are mixed, and there is a large amount of monochrome text.

Next, FIG. 3A illustrates an image file 118e in which an image and color text are mixed. FIG. 3B illustrates an image file 118f in which an image and monochrome text are mixed. FIG. 3C illustrates an image file 118g when an image, color text and monochrome text are mixed, and the amount of color text is larger than the amount of monochrome text. FIG. 3D illustrates an image file 118h when an image, color text and monochrome text are mixed, and the amount of monochrome text is larger than the amount of color text.

Figure 4B:
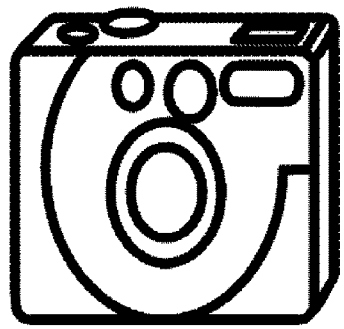
FIG. 4B explains an example of extracting characteristics of an object by the characteristic-extracting unit in FIG. 1, and illustrates an image file when images and monochrome text are mixed, and there is a large number of images.
Figure 4B:
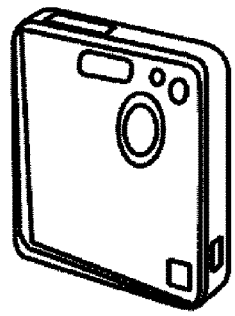
Figure 4C:
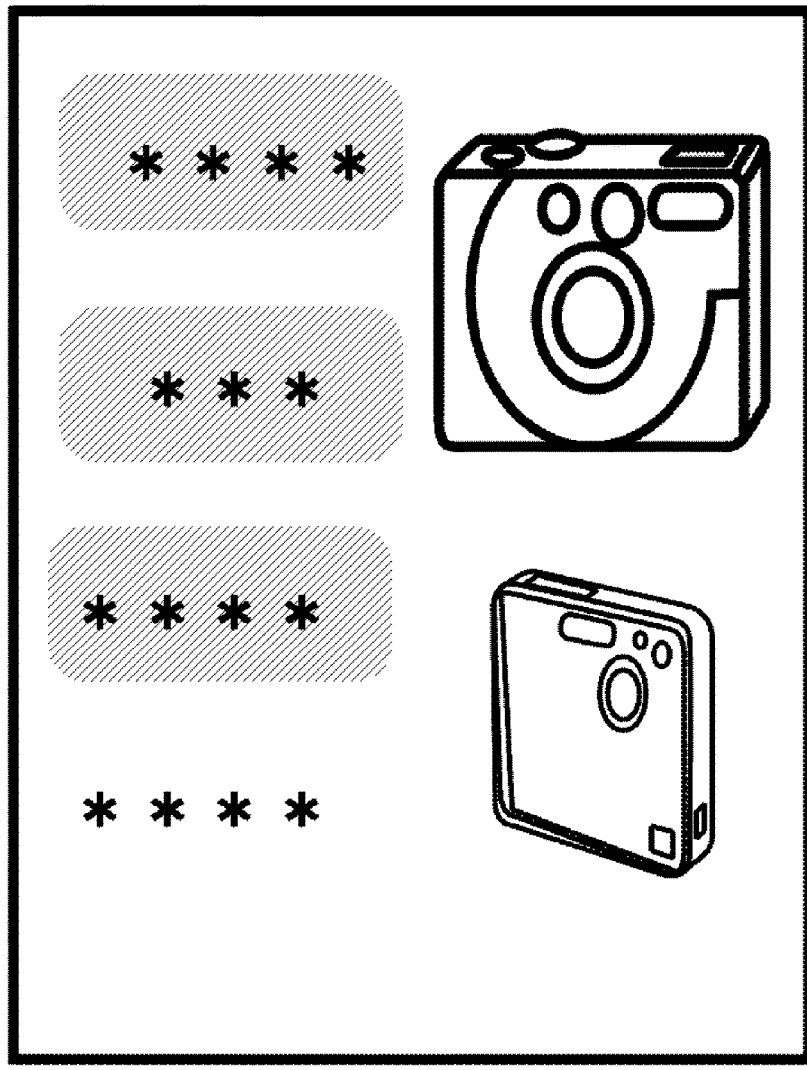
FIG. 4C explains an example of extracting characteristics of an object by the characteristic-extracting unit in FIG. 1, and illustrates an image file when images, color text and monochrome text are mixed, and there is a large amount of color text and a large number of images.
Figure 4D:
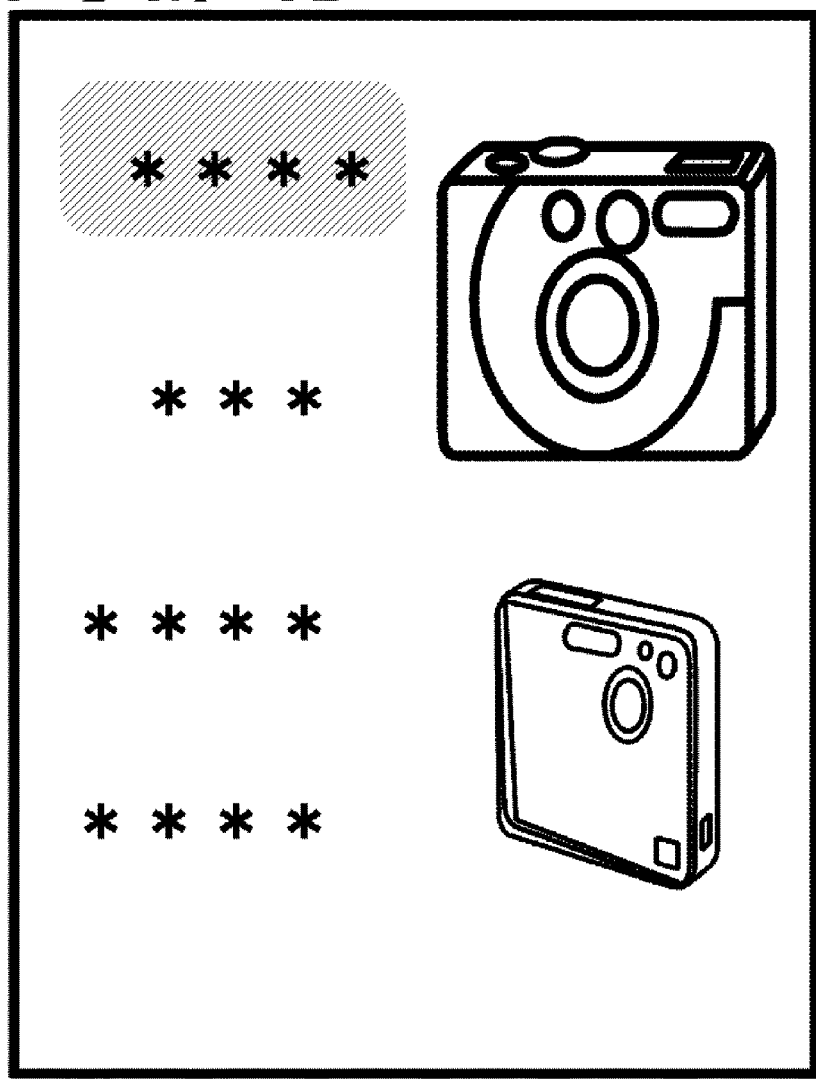
FIG. 4D explains an example of extracting characteristics of an object by the characteristic-extracting unit in FIG. 1, and illustrates an image file when images, color text and monochrome text are mixed, and there is a large amount of monochrome text and a large number of images.

Next, FIG. 4A illustrates an image file 118i in which images and color text are mixed, and there is a large number of images. FIG. 4B illustrates an image file 118j in which images and monochrome text are mixed, and there is a large number of images. FIG. 4C illustrates an image file 118k in which images, color text and monochrome text are mixed, the amount of color text is larger than the amount of monochrome text, and there is a large number of images. FIG. 4D illustrates an image file 118l in which images, color text and monochrome text are mixed, the amount of monochrome text is larger than the amount of color text, and there is a large number of images.

In this embodiment, "a large number of images" indicates that the ratio of the total number of pixels of images that occupy the number of pixels of an entire page (including margins) is equal to or greater than a specified threshold value (for example, 25%). The number of total pixels of images may be replaced by the number of image objects (two in the examples in FIG. 4A to 4D). Moreover, "a large number of images" may also indicate that the ratio of the number of pixels of images with respect to the number of pixels of text is equal to or greater than specified threshold value (for example, 200%).

Next, an example of a test copy selection list 105A that is displayed on the panel unit 105 by the panel-operation-control unit 119 will be explained with reference to FIG. 5. The selection list 105A in FIG. 5 illustrates a case in which the panel-operation control unit 119 receives a test copy instruction via the panel unit 105.

In other words, the selection list 105A that is displayed on the panel unit 105 includes selection items that correspond to objects having a specified characteristic or a combination of objects having different characteristics. For example, the selection list 105A includes setting items 105a to 105l that correspond to any one or any combination of any two or more of color text, monochrome text and an image. Setting item 105a has contents selected when performing a test copy of color text. When setting item 105a is selected, the characteristic-extracting unit 118 extracts a page that corresponds to the image file 118a in FIG. 2A. Setting item 105b has contents selected when performing a test copy of monochrome text. When setting item 105b is selected, the characteristic-extracting unit 118 extracts a page that corresponds to the image file 118b in FIG. 2B. Setting item 105c is for the case in which color text and monochrome text are mixed, and has contents selected when performing a test copy of a page that has a large amount of color text. When setting item 105c is selected, the characteristic-extracting unit 118 extracts a page that corresponds to the image file 118c in FIG. 2C. Setting item 105d is for the case in which color text and monochrome text are mixed, and has contents selected when performing a test copy of a page that has a large amount of monochrome text. When setting item 105d is selected, the characteristic-extracting unit 118 extracts a page that corresponds to the image file 118d in FIG. 2D.

Setting item 105e has contents selected when performing a test copy of a page on which an image and color text are mixed. When setting item 105e is selected, the characteristic-extracting unit 118 extracts a page that corresponds to image file 118e in FIG. 3A. Setting item 105f has contents selected when performing a test copy of a page on which an image and monochrome text are mixed. When setting item 105f is selected, the characteristic-extracting unit 118 extracts a page that corresponds to image file 118f in FIG. 3B. Setting item 105g has contents selected when performing a test copy of a page in the case when an image, color text and monochrome text are mixed, and there is a large amount of color text. When setting item 105g is selected, the characteristic-extracting unit 118 extracts a page that corresponds to image file 118g in FIG. 3C. Setting item 105h has contents selected when performing a test copy of a page in the case when an image, color text and monochrome text are mixed, and there is a large amount of monochrome text. When setting item 105h is selected, the characteristic-extracting unit 118 extracts a page that corresponds to image file 118h in FIG. 3D.

Setting item 105i has contents selected when performing a test copy of a page in the case when images and color text are mixed, and when there is a large number of images. When setting item 105i is selected, the characteristic-extracting unit 118 extracts a page that corresponds to image file 118i in FIG. 4A. Setting item 105j has contents selected when performing a test copy of a page in the case when images and monochrome text are mixed, and when there is a large number of images. When setting item 105j is selected, the characteristic-extracting unit 118 extracts a page that corresponds to image file 118j in FIG. 4B. Setting item 105k has contents selected when performing a test copy of a page in the case when images, color text and monochrome text are mixed, and when there is a large amount of color text and a large number of images. When setting item 105k is selected, the characteristic-extracting unit 118 extracts a page that corresponds to image file 118k in FIG. 4C. Setting item 105l has contents selected when performing a test copy of a page in the case when images, color text and monochrome text are mixed, and when there is a large amount of monochrome text and a large number of images. When setting item 105l is selected, the characteristic-extracting unit 118 extracts a page that corresponds to image file 118l in FIG. 4D.

Next, the test copy process will be explained with reference to FIG. 6. In the following, the case will be explained in which plural pages of a document that are set on an ADF in advance are read once by a scanner unit 101, and the read image data is stored, for example, in the HDD 106.

(Step S101)

The system-control unit 121 determines whether or not there is an instruction for a test copy.

In this case, when there is no notification indicating that a test copy instruction is received from the panel-operation-control unit 119 via the panel unit 105, the system-control unit 121 determines that there is no test copy instruction (step S101: NO).

However, when there is a notification indicating that a test copy instruction is received from the panel-operation-control unit 119 via the panel unit 105, the system-control unit 121 determines that there is a test copy instruction (step S101: YES), and processing moves to step S102.
(Step S103)

The system-control unit 121 causes the selection list 105A to be displayed.

In this case, the system-control unit 121 instructs the panel-operation-control unit 119 to display the selection list 105A illustrated in FIG. 5 on the panel unit 105. At this time, the system-control unit 121 gives the selection list 105A that is stored in the HDD 106, for example, to the panel-operation-control unit 119.
(Step S103)

The system-control unit 121 determines whether or not a setting item 105a to 105l is selected.

When there is no notification indicating that a selection of a setting item 105a to 105l is received from the panel-operation-control unit 119 via the panel unit 105, the system-control unit 121 determines that a setting item 105a to 105l is not selected (step S103: NO). However, when there is a notification indicating that a selection of a setting item 105a to 105l is received from the panel-operation-control unit 119 via the panel unit 105, the system-control unit 121 determines that a setting item 105a to 105l is selected (step S103: YES), and processing moves to step S104.
(Step S104)

The system-control unit 121 gives an instruction for extracting characteristics of an image.

In this case, the system-control unit 121 instructs the characteristic-extracting unit 118 to extract characteristics of an object. Moreover, the system-control unit 121, together with notifying the characteristic-extracting unit 118 of a selected setting item 105a to 105l, gives image data for each page read by the scanner unit 101 and stored in the HDD 106 to the characteristic-extracting unit 118. When plural setting items 105a to 105l are selected, the system-control unit 121 notifies the characteristic-extracting unit 118 of the plural selected setting items 105a to 105l.

At this time, when a notification for setting item 105a is received, for example, the characteristic-extracting unit 118, by object recognition, extracts a page having only color text (corresponds to image file 118a in FIG. 2A) from the image data for each page, and notifies the system-control unit 121. Moreover, when a notification for setting item 105b is received, for example, the characteristic-extracting unit 118, by image recognition, extracts a page having only monochrome text (corresponds to image file 118b in FIG. 2B) from the image data for each page, and notifies the system-control unit 121. Furthermore, when a notification for setting item 105c is received, for example, the characteristic-extracting unit 118, by object recognition, extracts a page on which color text and monochrome text are mixed, and there is a large amount of color text (corresponds to image file 118c in FIG. 2C) from the image data for each page, and notifies the system-control unit 121. Moreover, when a notification for setting item 105d is received, for example, the characteristic-extracting unit 118, by object recognition, extracts a page on which color text and monochrome text are mixed, and there is a large amount of monochrome text (corresponds to image file 118d in FIG. 2D) from the image data for each page, and notifies the system-control unit 121.

Furthermore, when a notification for setting item 105e is received, for example, the characteristic-extracting unit 118, by object recognition, extracts a page on which an image and color text are mixed (corresponds to image file 118e in FIG. 3A) from the image data for each page, and notifies the system-control unit 121. When a notification for setting item 105f is received, for example, the characteristic-extracting unit 118, by object recognition, extracts a page on which an image and monochrome text are mixed (corresponds to image file 118f in FIG. 3B) from the image data for each page, and notifies the system-control unit 121. When a notification for setting item 105g is received, for example, the characteristic-extracting unit 118, by object recognition, extracts a page on which an image, color text and monochrome text are mixed, and there is a large amount of color text (corresponds to image file 118g in FIG. 3C) from the image data for each page, and notifies the system-control unit 121. Moreover, when a notification for setting item 105h is received, for example, the characteristic-extracting unit 118, by object recognition, extracts a page on which an image, color text and monochrome text are mixed, and there is a large amount of monochrome text (corresponds to image file 118h in FIG. 3D) from the image data for each page, and notifies the system-control unit 121.

Furthermore, when a notification for setting item 105i is received, for example, the characteristic-extracting unit 118, by object recognition, extracts a page on which images and color text are mixed, and there is a large number of images (corresponds to image file 118i in FIG. 4A) from the image data for each page, and notifies the system-control unit 121. Moreover, when a notification for setting item 105j is received, for example, the characteristic-extracting unit 118, by object recognition, extracts a page on which images and monochrome text are mixed, and there is a large number of images (corresponds to image file 118j in FIG. 4B) from the image data for each page, and notifies the system-control unit 121. When a notification for setting item 105k is received, for example, the characteristic-extracting unit 118, by object recognition, extracts a page on which images, color text and monochrome text are mixed, and there is a large amount of color text and a large number of images (corresponds to image file 118k in FIG. 4C) from the image data for each page, and notifies the system-control unit 121. Moreover, when a notification for setting item 105l is received, for example, the characteristic-extracting unit 118, by object recognition, extracts a page on which images, color text and monochrome text are mixed, and there is a large amount of monochrome text and a large number of images (corresponds to image file 118l in FIG. 4D) from the image data for each page, and notifies the system-control unit 121.

When a notification of a setting item 105i to 105l is received, the characteristic-extracting unit 118 notifies the system-control unit 121 of the page having the largest number of images.
(Step S105)

The system-control unit 121 determines whether or not there is a notification of an extracted page.

In this case, when there is no notification from the characteristic-extracting unit 118, the system-control unit 121 determines there is no notification of an extracted page (step S105: NO).

However, when there is a notification from the characteristic-extracting unit 118, the system-control unit 121 determines there is a notification of an extracted page (step S105: YES), and processing moves to step S106.
(Step S106)

The system-control unit 121 gives an instruction for printing.

In this case, the system-control unit 121 instructs the image-processing unit 117 and the printer-control unit 112 to perform printing.

Here, for example, when the system-control unit 121 receives a notification from the characteristic-extracting unit 118 of a page that corresponds to one or plural setting items 105a to 105l, the system-control unit 121 reads image data of a page that corresponds to the received one or plural setting items 105a to 105l from the HDD 106, and gives that image data to the image-processing unit 117.

At this time, the image-processing unit 117 performs image processing on the received image data, and generates printing data. The system-control unit 121 causes the printing data that is generated by the image-processing unit 117 to be stored in RAM 115. Then, based on the printing data, the printer-control unit 112 controls the printer unit 102, and executes printing on paper.

Here, particularly when printing is performed of a page that corresponds to plural setting items 105a to 105l, it is possible to perform a test copy once for respective pages having different characteristics.

(Step S107)

The system-control unit 121 determines whether or not printing of a test copy is complete.

In this case, when there is no notification from the printer-control unit 112 that printing is complete, the system-control unit 121 determines that printing of a test copy is not complete (step S107: NO).

However, when there is a notification from the printer-control unit 112 that printing is complete, the system-control unit 121 determines that printing of a test copy is complete (step S107: YES), and processing moves to step S108.

(Step S108)

The system-control unit 121 determines whether or not there is an instruction to finish confirmation.

In this case, when there is no notification from the panel-operation-control unit 119 via the panel unit 105 indicating that an instruction to finish confirmation has been received, the system-control unit 121 determines there is no instruction to finish confirmation (step S108: NO).

However, when there is a notification from the panel-operation-control unit 119 via the panel unit 105 indicating that an instruction to finish confirmation has been received, the system-control unit 121 determines there is an instruction to finish confirmation (step S108: YES), and processing moves to step S109.

When there is no notification from the panel-operation-control unit 119 via the panel unit 105 indicating that an instruction to finish confirmation has been received, the system-control unit 121 may end processing for a set amount of time. In other words, when the printed contents of a test copy are not finished as expected; for example, resetting the color settings or the like is performed. In this case, by executing processing again from step S101 after resetting of the color settings is performed, it is possible to execute printing of the test copy.

(Step S109)

The system-control unit instructs printing of the remaining pages.

In this case, the system-control unit 121 instructs the image-processing unit 117 and the printer-control unit 112 to print the remaining pages. Moreover, the system-control unit 121 together with notifying the image-processing unit 117 that printing of the test copy is finished, gives the image data that is read from the HDD to the image-processing unit 117.

At this time, the image-processing unit 117 executes image processing on the received image data except for the image data of the printed page. The system-control unit 121 causes the printing data that is generated by the image-processing unit 117 to be stored in RAM 115. Then, based on the printing data, the printer-control unit 112 controls the printer unit 102 and executes printing of the remaining pages on paper.

When there is a plural number of sets of copies to be printed, the system-control unit 121 instructs the image-processing unit 117 and the printer-control unit 112 to print, and instructs of the number of copies to print. Moreover, when giving an instruction to print, the system-control unit 121 instructs printing of the remaining pages of the first set of copies, however, instructs printing of all pages for the remaining sets of copies.

In this way, by the system-control unit 121 instructing printing of the remaining pages, it is possible to prevent wasting paper.

(Step S110)

The system-control unit 121 determines whether or not printing is complete.

In this case, when there is no notification from the printer-control unit 112 that printing is complete, the system-control unit 121 determines that printing is not complete (step S110: NO).

However, when there is a notification from the printer-control unit 112 that printing is complete, the system-control unit 121 determines that printing is complete (step S110: YES), and ends processing.

In the explanation above, the case was explained in which printing is performed of pages that correspond to respective setting items 105a to 105l, however, the system-control unit 121, in step S104, may instruct the characteristic-extracting unit 118 to extract only images from all of the pages, and in step S106, may instruct the image-processing unit 117 to perform image processing on a collection of images that are extracted by the characteristic-extracting unit 118 on one page. In this case, performing a test copy of a collection of plural images that are extracted by the characteristic-extracting unit 118 on one page is possible, so it is possible to confirm the finished copy of images that are shown on plural pages of a document at one time. Moreover, plural images that are extracted by the characteristic-extracting unit 118 are printed on paper for a test copy, however, the images that are extracted by the characteristic-extracting unit 118 are collected on the paper, so it is possible to keep wasting of paper to a minimum (for example, one sheet of paper).

Moreover, the case was explained in which the characteristic-extracting unit 118 above, according to an instruction from the system-control unit 121, performs object recognition of image data for each page that is read by the scanner unit 101, and respectively extracts color text, monochrome text and images as objects. The embodiment is not limited to this, and it is also possible to have the characteristic-extracting unit 118, in the same way as described above, respectively extract color text, monochrome text and images that are registered in a user box of the HDD 106, for example, from a printing job that is registered from the user terminal side.

In this way, in this embodiment, the HDD 106 (storage device) stores image data of a document having plural pages that are read by the scanner unit 101, and based on an extraction instruction to extract characteristics of an object, the characteristic-extracting unit 118 extracts characteristics of an object by performing object recognition of image data on each page. Moreover, based on a characteristic selection instruction of an object, the system-control unit 121 instructs the characteristic-extracting unit 118 to perform extraction, and instructs the printer-control unit 112 to print image data of pages having the characteristics of the object that are extracted by the characteristic-extracting unit 118.

As a result, when performing a test copy by setting a document having plural pages on an ADF and reading the document by a scanner, only the pages based on the object characteristic selection instruction are printed. Therefore, there is no need to place the pages of a document that are used for a test copy in order back into the other pages of the document, or to set the entire document on the ADF again. Therefore, it is possible to solve the problem of work related to copying when a test copy is performed becoming complicated.

In the case of the image processing apparatus of the typical example described above, the printing-setting-generating unit generates plural recommended printing settings, so by selecting from among those settings recommended printing settings that are to be actually outputted, it is possible to perform test printing. Moreover, test printing via a printer driver is such that it is possible to confirm images that are drawn using word processing software, for example, so selecting a page to be the target of analysis by the object-analysis unit is simple.

Incidentally, in the image forming apparatus of the typical example described above, when copying a plural number of sets of a document having plural pages for example, selection of the copy function, setting the document on the ADF (auto document feeder), setting the number of sets of copies, and operating the copy start button are performed. As a result, the document that is set on the ADF is read one page at a time by the scanner unit, and the read image data is printed on paper. In this way, in the image forming apparatus, configuration is such that when copying a document, the image data that is read by the scanner unit is printed on paper in order, so confirming whether or not printing of the read image data is finished as expected (hereafter, referred to as a test copy) cannot be performed before the image data is printed on paper.

In this case, of the document having plural pages, it is possible, for example, to perform a test copy by setting an arbitrary page of the document on the ADF and having the scanner unit read that page. However, after putting the arbitrary page of the document that is used for the test copy back in order into the other pages of the document, all of the pages of the document must be set on the ADF again. Therefore, there is a problem in that the work related to copying when a test copy is performed becomes complicated.

However, with the image forming apparatus and recording medium according to the present disclosure, when performing a test copy by setting a document having plural pages on an ADF and having a scanner read the document, for example, only a page based on a selection instruction of object characteristics is printed. Therefore, it is not necessary to put the arbitrary page that is used for a test copy back in order into the other pages of the document, and it is not necessary to set the entire pages of the document on the ADF again. Consequently, the problem of the work related to copying when a test copy is performed becoming complicated can be solved.

In this embodiment, that case of applying an image forming apparatus to a MFP 100 is explained, however, the embodiment is not limited to this example, and may also be applied to other image forming apparatuses such as a multifunctional printer and the like.

What is claimed is:

1. An image forming apparatus, comprising:
a scanner unit;
a printer-control unit that executes a printing process of image data;
a storage device that stores image data of a document having plural pages that is read by the scanner unit;
a characteristic-extracting unit that, based on an extraction instruction to extract characteristics of an object, extracts characteristics of the object by object recognition of image data for each of the pages; and
a system-control unit that, based on a selection instruction to select characteristics of the object, instructs the characteristic-extracting unit to perform the extraction, and instructs the printer-control unit to perform test printing of image data of a page having the object characteristics that are extracted by the characteristic-extracting unit, wherein
the characteristics of the object correspond to attributes of the object included in the image data for each of the pages, the number of each attribute and the color of each attribute,
after printing of image data of a page having the characteristics of the object is finished, the system-control unit, based on a confirmation complete instruction, instructs the printer-control unit to print the remaining pages.

2. The image forming apparatus according to claim 1 having
a selection list that has plural setting items for selecting characteristics; wherein
when one or plural setting items are selected, the system-control unit instructs the characteristic-extracting unit to extract characteristics of an object that corresponds to the selected setting item or setting items.

3. The image forming apparatus according to claim 2, wherein
the setting item or setting items have contents for selecting an object having a specified characteristic or a combination of objects having different characteristics.

4. A recording medium that is a non-transitory computer-readable recording medium that stores an image forming program that can be executed by a computer, wherein the image forming program is an image forming program that causes a computer of an image forming apparatus that has a printer-control unit that executes a printing process for printing image data to execute:
a process by a storage device that stores image data of a document having plural pages that are read by a scanner unit;
a process by a characteristic-extracting unit that, based on an extraction instruction to extract characteristics of an object, extracts characteristics of the object by object recognition of image data for each page;
a process by a system-control unit that, based on a selection instruction to select characteristics of the object, instructs the characteristic-extracting unit to perform the extraction, and instructs the printer-control unit to perform test printing of image data of a page having the object characteristics that are extracted by the characteristic-extracting unit; and
a process by the system-control unit, after printing of image data of a page having the characteristics of the objects is finished, based on a confirmation complete instruction, instructs the printer-control unit to print the remaining pages, wherein the characteristics of the object correspond to attributes of the object included in the image data for each of the pages, the number of each attribute and the color of each attribute.

\* \* \* \* \*